US005998063A

United States Patent [19]
Kobayashi et al.

[11] Patent Number: 5,998,063
[45] Date of Patent: *Dec. 7, 1999

[54] LITHIUM SECONDARY CELL

[75] Inventors: Naoya Kobayashi; Soichiro Kawakami, both of Nara; Shinya Mishina, Kawasaki; Masaya Asao, Tsuzuki-gun, all of Japan

[73] Assignee: Canon Kabushiki Kaisha

[*] Notice: This patent issued on a continued prosecution application filed under 37 CFR 1.53(d), and is subject to the twenty year patent term provisions of 35 U.S.C. 154(a)(2).

[21] Appl. No.: 08/848,879

[22] Filed: May 1, 1997

Related U.S. Application Data

[63] Continuation of application No. 08/563,958, Nov. 29, 1995, abandoned.

[30] Foreign Application Priority Data

Dec. 2, 1994 [JP] Japan ................................. 6-299417
Nov. 24, 1995 [JP] Japan ................................. 7-306311

[51] Int. Cl.[6] ........................................... H01M 4/36
[52] U.S. Cl. ................. 429/218.1; 429/220; 429/221; 429/223; 429/224
[58] Field of Search ................................. 429/218, 220, 429/221, 223, 224, 125, 218.1

[56] References Cited

U.S. PATENT DOCUMENTS

| | | | |
|---|---|---|---|
| 4,085,258 | 4/1978 | Shimazaki et al. | 429/125 |
| 4,125,687 | 11/1978 | Di Salvo et al. | 429/224 X |
| 5,035,963 | 7/1991 | Plichta et al. | 429/221 X |
| 5,110,696 | 5/1992 | Shokoohi et al. | 429/224 X |
| 5,154,990 | 10/1992 | Plichta et al. | 429/220 X |
| 5,316,875 | 5/1994 | Murai et al. | 429/224 X |
| 5,358,805 | 10/1994 | Fujimoto et al. | 429/224 X |
| 5,429,890 | 7/1995 | Pynenburg et al. | 429/223 X |

FOREIGN PATENT DOCUMENTS

| | | |
|---|---|---|
| 4030205 | 4/1991 | Germany. |
| 63-013264 | 1/1988 | Japan. |
| 63-114057 | 5/1988 | Japan. |
| 05047381 | 2/1993 | Japan. |
| 05190171 | 7/1993 | Japan. |
| 05234585 | 9/1993 | Japan. |
| 06283157 | 10/1994 | Japan. |

OTHER PUBLICATIONS

J. Electrochem. Soc., vol. 139, No. 12, Dec. 1992, pp. 3397–3403, R. Kanno, et al., "Carbon Fiber as a Negative Electrode in Lithium Secondary Cells".

J. Electrochem. Soc., vol. 141, No. 11, Nov. 1994, pp. L147–150, E. Ferg et al., "Spinal Anodes for Lithium–Ion Batteries".

J. App. Electrochem., vol. 22, No. 7, Jul. 1993, pp. 620–627, N. Kumagai et al., "Cycling Behaviour of Lithium–Aluminum Alloys Formed on Various Aluminum Substrates as Negative Electrodes in Secondary Lithium Cells".

*Primary Examiner*—Stephen Kalafut
*Attorney, Agent, or Firm*—Fitzpatrick, Cella, Harper & Scinto

[57] ABSTRACT

Provided is a lithium secondary cell having a positive pole and a negative pole separated by a separator in an electrolyte in a cell case, which has the negative pole comprising a substance which can contain lithium and/or the positive pole comprising a substance to which lithium can be inserted, thus being excellent in excessive discharge characteristics, high in energy density, and long in cycle life even in applications where a plurality of cells are connected in series or in parallel.

15 Claims, 3 Drawing Sheets

LITHIUM SECONDARY CELL

This application is a continuation of application Ser. No 08/563,958 filed Nov. 29, 1995, now abandoned.

BACKGROUND OF THE INVENTION

1. Field of the Invention

The present invention relates to a lithium secondary cell, and more particularly to a lithium secondary cell using lithium for the negative pole whereby a reduction in cell life due to excessive discharge can be improved.

2. Related Background Art

The amount of $CO_2$ gas contained in the air has been increasing over the past years, and a possibility is presented that the greenhouse effect will cause global warming. Thermal power plants convert thermal energy obtained by burning fossil fuels, etc. into electric power. It is, however, becoming difficult to construct new thermal power plants which could emit large amounts of $CO_2$ gas or $NO_x$, hydrocarbons, CO, etc. with burning of fuels. Thus, as an effective utilization method of electric power generated by generators in the thermal power plants, it is proposed that so-called load leveling be used, wherein nighttime power is stored in secondary cells installed in ordinary households and the stored electric power is consumed in the daytime when power consumption is high. For applications to electric vehicles considered not to emit air pollutants including $CO_x$, $NO_x$, hydrocarbons, etc., there are demands to develop secondary cells of higher energy density. Further, for applications to light sources for portable equipment such as book-type personal computers, word processors, video cameras, and portable telephones, it is of urgent necessity to develop more compact, lighter, and higher-performance secondary cells.

Such more compact, lighter, and higher-performance secondary cells are under development, for example, like a rocking chair type lithium ion cell using an anode activator of a material obtained by introducing lithium ions into an intercalation compound and a cathode activator of carbon, which is partly being used in practice. Further, development is under way for a lithium secondary cell using a cathode activator of metallic lithium, which can attain higher energy density than the lithium ion secondary cell.

Also used in practice is a lithium secondary cell using a negative-pole material of a metal oxide such as niobium pentoxide ($Nb_2O_5$). (The cell of this type has a feature of long cycle life, because metallic lithium is not separated out upon charge. However, it has the disadvantage of lower energy density than that of other lithium secondary cells.)

When these higher-energy-density lithium ion secondary cells and lithium secondary cells are used in the electric vehicles or portable equipment as described above, they are often used as a combinational cell increased in current and voltage by connecting a plurality of cell elements in series or in parallel. In applications as a combinational cell, a cell element with the smallest discharge capacity is always first to be discharged up, because of variations in capacity or variations in cycle life characteristics between the cell elements connected. Therefore, this cell element with the smallest discharge capacity is always excessively discharged before completion of discharge of the other cells. Then this cell element becomes a rate-determining factor and decreases the cycle life. As a result, the life of the combinational cell is also decreased.

Meanwhile, examples of secondary cells already commercially available and used in practice are nickel-cadmium secondary cells and nickel-zinc secondary cells. These are called "aqueous cells", because they use alkali dissolved in water as a solvent of an electrolyte solution. In order to prevent the over discharge or excessive discharge, which is a problem for the lithium ion secondary cell etc., the aqueous cells use a technique of preliminarily adding an activator in a charged state (called a discharge reserve), such as metallic cadmium or metallic zinc, into the cathode activator, thereby suppressing decomposition or the like of the electrolyte solution (electrolysis of water occurs after using up the dischargeable activator in the electrode, thereby generating hydrogen gas from the negative pole) by discharging this activator in the charged state upon excessive discharge.

However, reactions upon charge and discharge, of the cathode activator in the above aqueous cells are repeated between hydroxide and metal (for example, in the case of nickel-cadmium cell, the reactions are as follows: $Cd+2OH^- \leftrightarrows Cd(OH)_2+2e^-$), whereas in the case of the lithium secondary cell, lithium ions are transferred through the electrolyte solution between the positive pole (anode) and the negative pole (cathode). Namely, the reaction modes upon charge and discharge are different, and thus, the concept of discharge reserve as in the above aqueous secondary cells cannot be applied to the lithium secondary cell as it is.

When the lithium secondary cell is excessively discharged, excessive lithium ions are inserted into a crystal lattice of the anode activator in the positive pole, which deforms or breaks the lattice. After that, the anode activator results in decreasing its amounts of inclusion and detachment of lithium ions, which could be a cause to decrease the cell life.

In the case of the lithium secondary cell using lithium metal, the negative pole reacts with anions in the electrolyte solution to form a film on the surface of lithium metal, upon excessive discharging which lowers reversibility of inclusion and detachment of lithium. This could be a cause of shortening the cell life. The electrolyte solution is also decomposed to form hydrocarbons and carbonic acid gas, which increases the concentration of the electrolyte solution so as to cause a decrease in conductivity. This could be another cause to decrease the cell life. In the case of the lithium ion secondary cell using carbon for the negative pole, a film formed by a reaction with anions in the electrolyte solution on the carbon surface obstructs insertion and detachment of lithium ions between carbon layers, which could be a cause of shortening the cell life.

Accordingly, there is a need to devise some means against excessive discharge for the lithium secondary cell and the lithium ion secondary cell. It is, however, a present status that, in applications to combinational cells, which are likely to cause excessive discharge in practical use, the countermeasures listed below are employed in order to decrease excessive discharge as much as possible, but neither of them can present a substantial improvement.

(a) To make capacities of cell elements used in a combinational cell even.

(b) To set a high final discharge voltage.

(c) To monitor and control voltages of the respective cell elements.

Therefore, there are demands to develop a lithium secondary cell having a higher energy density, which is free of any decrease in the cell life even if the cell is subjected to excessive discharge.

SUMMARY OF THE INVENTION

An object of the present invention is to provide a lithium secondary cell excellent in the excessive discharge characteristics, high in the energy density, and long in the cycle life.

Another object of the present invention is to provide a lithium secondary cell showing little deterioration of cell and having a long cycle life even when cells of the present invention are used as connected in series or in parallel.

Another object of the present invention is to provide a lithium secondary cell having a positive pole and a negative pole separated by a separator in an electrolyte in a cell case, which has the negative pole comprising a substance which can contain lithium, capable of being used as the positive pole and/or the positive pole comprising a substance to which lithium can be inserted, capable of being used as the negative pole.

DETAILED DESCRIPTION OF THE PREFERRED EMBODIMENTS

The above objects can be achieved by such an arrangement that the positive pole or the negative pole has a desired substance. As employed herein, the positive pole means cathode and the negative pole means anode.

Namely, the above objects can be achieved by a cell wherein the positive pole has a constituent substance which can be a constituent substance used for negative pole and the negative pole has a constituent substance which can be a constituent substance used for positive pole.

More specifically, the positive pole has a substance to which lithium can be inserted, capable of being used in the negative pole, and the negative pole has a substance containing lithium, capable of being used in the positive pole. That is, the two electrodes have the respective substances capable of serving as opposite-pole active materials to the respective electrodes.

According to the present invention, the negative electrode, the anode, contains a cathode active material, as well as an anode active material and the positive electrode, the cathode, contains an anode active material, as well as a cathode active material.

The above arrangement is considered to be effective because insertion of lithium and release of lithium occurs upon excessive discharge into or from the substances capable of serving as the opposite-pole active materials added in the negative pole and/or in the positive pole. In more detail, in the negative pole lithium is released from the cathode active material activator, contained in the negative pole, so that the negative pole can be prevented from being excessively discharged before the end of the release of lithium from the cathode active material added. On the other hand, in the positive pole lithium is inserted into the anode active material contained in the positive pole, so that the positive pole can be prevented from being excessively discharged before the end of insertion of lithium into the added anode active material. Accordingly, the arrangement in which the negative pole and/or the positive pole contain the respective substances capable of serving as the opposite-pole active materials can provide a lithium secondary cell having remarkably improved resistance to excessive discharge.

The present invention will be explained, referring to the drawings if necessary.

Lithium Secondary Cell

Figure 1:
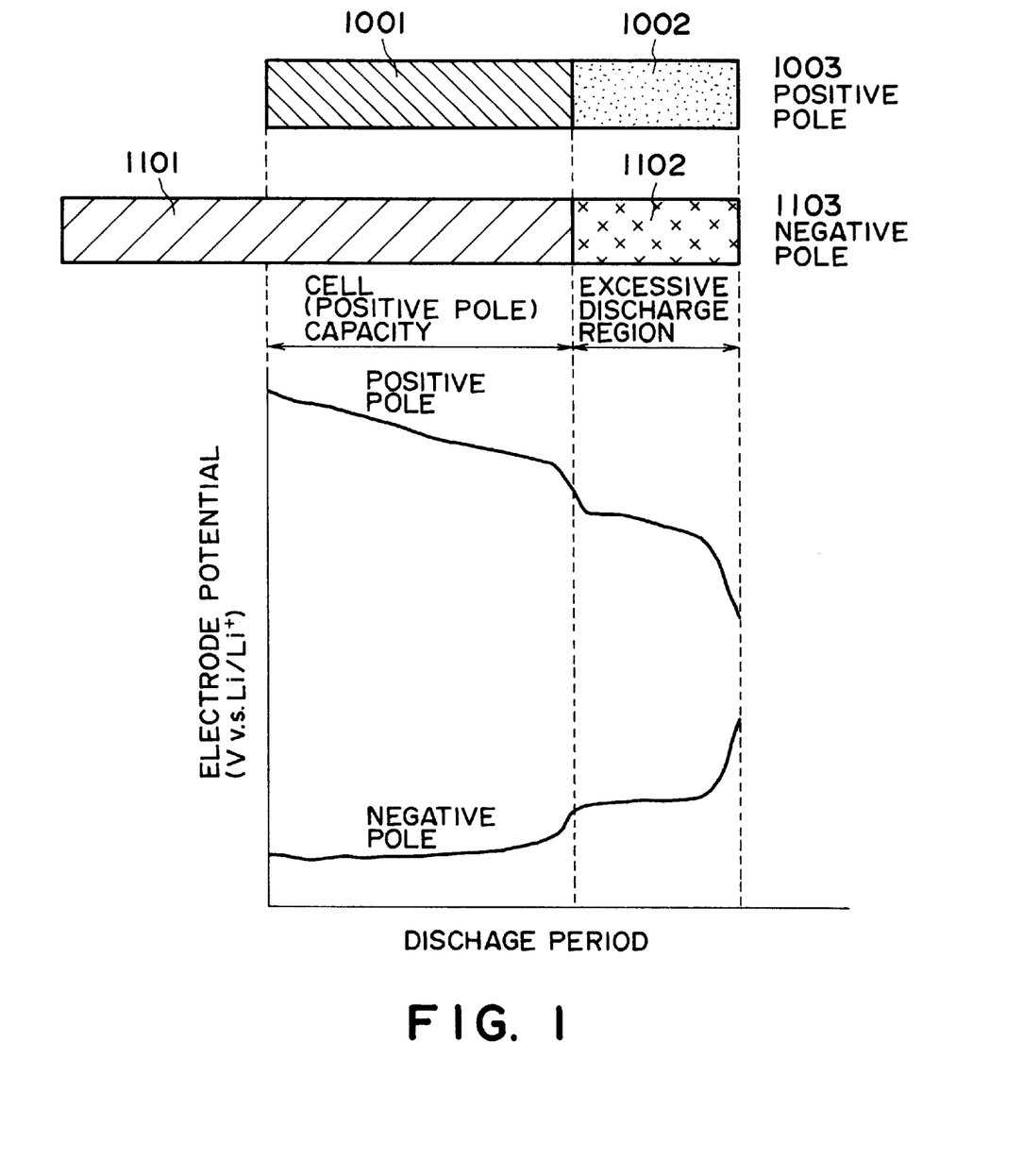
FIG. 1 and FIG. 2 are conceptual drawings to illustrate examples of discharge of respective lithium secondary cells.
Figure 2:
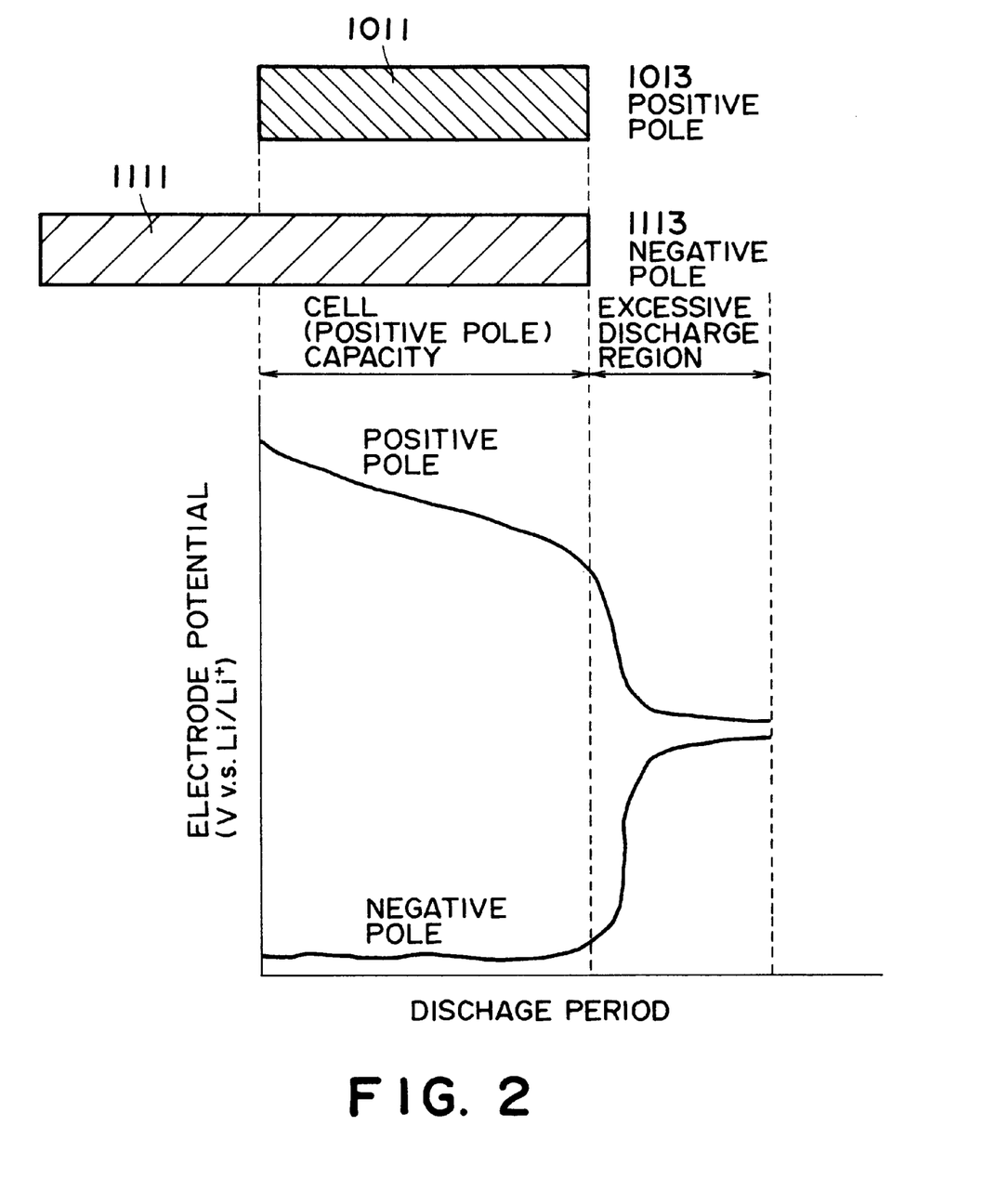

A lithium secondary cell in the present invention has a positive pole and a negative pole separated by a separator in an electrolyte in a cell case. FIG. 1 and FIG. 2 are conceptual drawings to illustrate relationships between cell capacity, excessive discharge region, and electrode potential.

Here, FIGS. 1 and 2 are explained briefly. The abscissa indicates the time when the cell is discharged at a constant current. In normal charge and discharge (without excessive discharge), the discharge voltage reaches a setting voltage in order to complete discharge within a period associated with the cell capacity, thereby preventing excessive discharge. Namely, excessive discharge of the cell is a state where the cell is discharged to below the setting voltage. The ordinate indicates potentials of the positive pole and the negative pole when a Li pole is a reference electrode. Here, a potential difference corresponds to a cell voltage.

The lithium secondary cell in the present invention has the negative pole containing the substance containing lithium and/or the positive pole containing the substance into which lithium can be inserted. Namely, as shown in FIG. 1, the negative pole 1103 contains cathode active material (as the substance containing lithium) 1102 containing lithium, in addition to anode active material 1101. Further, the positive pole 1003 contains anode active material (as the substance to which lithium can be inserted) 1002, in addition to a cathode active material 1001.

Next, is the case in which the cell of the present invention is charged.

Lithium contained in the cathode active material 1001 is released into the electrolyte solution side. Lithium is also inserted into the anode active material 1101 from the electrolyte solution. In FIG. 1, a reason why the capacity of the anode active material is greater than that of the cathode active material, is that part of lithium inserted into the negative pole upon charging is detached upon discharging. In order to overcome it, the cell of the present invention is arranged to include a higher concentration of the anode active material, as a margin. Namely, the higher concentration of the anode active material is used in order to preliminarily avoid a reduction in the cell life resulting from a decrease in the amount of bound lithium, which can substantially be used, upon repetition of the charge and discharge cycle.

Next is the case in which the cell of the present invention is discharged.

Normally, because a discharge end voltage is controlled in a single cell, it is discharged by the cell capacity of FIG. 1, but the cell will never be excessively discharged. However, when a plurality of cells are connected in series or in parallel, the cell with the smallest cell capacity goes into a state in which the positive pole 1013 and the negative pole 1113 both enter the excessive discharge region (FIG. 2) after first discharging. This means that the cell with the smallest capacity in the combinational cell is always subjected to excessive discharge during the charge and discharge cycles. This results in the problem of decreased cell life, as discussed previously.

In contrast, even if the cell of the present invention is in a state that can originally be termed the excessive discharge state as described above (which is shown as the "excessive discharge region" in FIG. 1), at the negative pole 1103 lithium is released from the inside of the cathode active material 1102 contained in the negative pole 1103, whereby the negative pole 1103 does not go into the excessive discharge state before all lithium ion has been released from the cathode active material added. Also, at the positive pole 1003 lithium is inserted into the anode active material 1002 contained in the positive pole 1003, whereby the positive pole 1003 does not go into the excessive discharge state before end of insertion of lithium into the anode active material added. As a result, in the case of the cell of the present invention, because the original active materials are prevented from being excessively discharged in the positive pole and the negative pole as long as the opposite-pole active materials added remains available capacity for discharge, cell deterioration can be effectively prevented, such as a damage to the crystal lattice of the active material, decomposition of the electrolyte solution, etc. The cell of the present invention can suppress the decrease in the cycle life accordingly.

This can be understood from the manner in which the electrode potentials change during the discharge period, as shown in FIG. 1 and FIG. 2. Namely, FIG. 2 shows that the difference between the electrode potentials is small immediately after the discharge enters the excessive discharge region, whereas FIG. 1 shows that the difference between the electrode potentials is maintained, to some extent, even in the region originally said to be the excessive discharge region, which confirms that it is effective to add the substances capable of serving as the respective opposite-pole active materials.

A discharge period available for excessive discharge depends upon the concentration of the substances capable of serving as the opposite-pole activators added to the negative pole and the positive pole. However, too great an increase in the concentration would result in forming local cells in the positive pole and the negative pole so as to increase self-discharging or shifting the electrode potentials to the potentials of the opposite-pole active materials to cause a drop in the cell voltage. Hence, the addition of the opposite-pole active materials to the negative pole and the positive pole are properly determined depending upon the use of the cell.

In order to protect the negative pole from deep discharge, the cathode active material added into the negative pole needs to keep a potential drop as small as possible in the excessive discharge region. It is thus preferred to use the cathode active material added to the negative pole, such that the potential is as close as possible to the anode active material therein.

When the cell after passing the excessive discharge region of FIG. 1 is next charged, lithium is released from the side of positive pole 1003 from the inside of the anode active material 1002 to which lithium was inserted, and lithium is inserted on the side of negative pole 1103 into the cathode active material 1102 from which lithium was released, thus returning the cell to its initial state. Consequently, when a combinational cell is produced by combining cells with capacity variation or with shorter cycle life in series or parallel connection, excessive discharge of these constituent cells can effectively be prevented. Therefore, the cell of the present invention can overcome the problem of excessive discharge in the combinational cell as described previously and can produce a combinational cell with longer cycle life.

Negative Pole

The negative pole 1103 in the present invention is one containing the cathode active material containing lithium (the substance containing lithium) 1102, in addition to the anode active material 1101.

A method for adding the cathode active material 1102 containing lithium into the negative pole 1103 may be selected, for example, from a method for uniformly mixing it with the anode active material in order to facilitate uniform reaction of the entire electrode upon excessive discharge, a method for coating the electrode surface, where the electrode reaction easily occurs, with the cathode active material, etc.

The following is an example of the method for producing the negative pole 1103.

(1) The cathode active material containing lithium, a conductive aid, and a binder are mixed in the anode active material of lithium, aluminum metal, a lithium alloy, an aluminum alloy, or carbon, and thereafter an organic solvent or the like is added thereto, thereby preparing a paste adjusted in the viscosity.

(2) The paste obtained in the above step (1) is applied or packed onto the surface of a collector member made of a metal, and thereafter it is dried or sintered to form the negative pole 1103.

It is also possible to lay a coating of the cathode active material containing lithium on the negative pole using the above anode active material so that lithium ion can readily be released from the cathode active material on the surface of the negative pole upon excessive discharge of cell. In the case of applying the coating of the cathode active material on the negative pole, use of a mixture of the anode active material and the cathode active material permits the anode active material also to be present on the surface of the electrode, making the electrode reaction easier to occur.

When a resin is used as the above binder, it is preferably a resin being stable in the electrolyte solution, for example, polytetrafluoroethylene, polyvinylidene fluoride, polyethylene, polypropylene, ethylene-propylene copolymer, ethylene-propylene-diene terpolymer, etc. More preferably, the binder is selected from those having elongation percentages of over 200% among the above resins.

When a resin is used as the above binder, expansion and contraction upon charge and discharge causes little decrease of active materials, but does cause a drop in collector performance. It is thus preferred to improve the collector performance by adding a conductive aid as selected from carbon powder such as carbon black (for example, Ketjen black, acetylene black, etc.), carbon fiber and metal fiber, and carbon fiber coated with a metal. If a low-melting-point glass is used as the above binder, it must have higher collector performance than the resins, but tends to have lower mechanical strength against expansion and contraction or bending.

The configuration of the collector member may be selected from various shapes including plate, foil, mesh, sponge, fiber, punching metal, and expand metal forms.

Process for Producing the Cathode Active Material Added to the Negative Pole

Preferred materials for the cathode active material added to the negative pole in the present invention are single or composite compounds selected, for example, from oxides, sulfides, hydroxides, selenides, etc. of Cu, Fe, Mo, Ti, V, Nb, Mn, Co, Ni, etc., containing (or coupled with) lithium. Among them, a compound having a potential as close to the potential of the anode active material as possible is preferably selected because the negative pole can be maintained thereby not to be greatly discharged upon excessive discharge of cell, and Cu, Fe, Mo, Ti, V, or Nb is more suitable.

The process for producing the cathode active material added to the negative pole is, for example, a process for mixing a compound or a metal of Cu, Fe, Mo, Ti, V, Nb, Mn, Co, or Ni with a lithium salt and thereafter thermally treating the mixture to obtain the cathode active material.

A specific example of the process using an oxide is a process for mixing an oxide of Cu, Mo, V, Mn, Co, or Ni with a lithium salt comprised of lithium nitrate, lithium hydroxide, or lithium carbonate and thereafter thermally treating the mixture in an air or oxygen atmosphere to obtain the cathode active material added to the negative pole. A specific example of the process using a sulfide is a process for thermally treating a metal or a compound salt such as a chloride, of Fe, Mo, or Ti together with the above lithium salt in a hydrogen sulfide flow.

Amount of the Cathode Active Material Added to the Negative Pole

The amount of the cathode active material added to the negative pole in the present invention differs depending upon what is used for the anode active material, but the cathode active material is preferably added at least as associated with capacity variations between cells when a plurality of cells are used.

The larger the amount of the cathode active material, the greater the capacity in the excessive discharge region, which makes the cell more resistant to excessive discharge. However, an increase in the amount of the cathode active material shifts the electrode potential of the negative pole to the electrode potential side of the cathode active material, and the cell voltage of a cell using this negative pole decreases, thereby lowering the energy density. Accordingly, when using the cathode active material having a greater electrode potential than that of the anode active material, there are some cases in which the amount added should preferably not be too high. Particularly, addition of too much cathode active material to the negative pole would form a local cell in the electrode to increase a quantity of self-discharge. Further adding too much cathode active material would cause inversion of the electrode potential into an anode potential, which is not preferred. For these reasons, the upper limit of the amount of the cathode active material added to the negative pole, though it cannot absolutely be determined because the potential differs depending upon the cathode active material selected, is preferably determined to be between 3% by weight and 60% by weight both inclusive, more preferably between 5% by weight and 40% by weight both inclusive, and further more preferably between 10% by weight and 20% by weight both inclusive.

Describing a specific example where aluminum or a lithium alloy is used for the anode active material, the cathode active material may be added up to 60% by weight, though it depends upon the other factors including the configuration of electrode, in order to achieve a volume energy density more than that of the carbon anode for lithium ion secondary cell. When an aluminum alloy is used for the anode active material, the amount of cathode active material added differs depending upon the content of a metal alloyed with aluminum; for example, if the alloy is an alloy of aluminum and nickel (Al:Ni=50:50), the cathode active material can be added up to 40% by weight, though it also depends upon the other factors in this case.

If the electrode potential of the cathode active material added is close to that of the anode active material, the amount may be too large. Considering the fact that the capacity variations of actual cells are about 10%, a preferred addition amount is not less than 10% by capacity of the cathode capacity, as described above.

Anode Active Material

Substances suitable for the anode active material in the present invention are, for example, lithium metal, a lithium alloy, carbon, aluminum, an aluminum alloy, etc.

A preferred carbon material is one that can insert and release as many lithium ions as possible. For example, suitable carbon materials include artificial graphites obtained by thermally treating coal pitch or petroleum pitch or the like at various temperatures, carbon, and those obtained by thermally treating natural graphite at various temperatures under a vacuum atmosphere or under an inert gas atmosphere such as helium or argon.

The lithium alloy suitably applicable may be, for example, an alloy of lithium with either one metal selected from aluminum, magnesium, potassium, sodium, calcium, strontium, barium, silicon, germanium, tin, lead, indium, and zinc. Particularly suitable are aluminum, magnesium, calcium, and lead.

The applicable aluminum alloy may be, for example, an alloy of aluminum with either one metal selected from nickel, cobalt, copper, and titanium.

With the aluminum metal and the aluminum alloy, the surface thereof is preferably subjected to an etching treatment or the like. The reason is that growth of dendrite can be suppressed by increasing a specific surface area so as to decrease the effective current density when assembled into a cell.

The applicable etching process may be, for example, chemical etching, electrochemical etching, or plasma etching.

The chemical etching is a process for etching an object to be etched by letting it react with an acid or alkali solution. Etchants for metal alloy powder containing a metal element forming an alloy with lithium, that is, aluminum, zinc, lead, or tin are, for example, phosphoric acid, sulfuric acid, hydrochloric acid, nitric acid, acetic acid, hydrofluoric acid, potassium hydroxide, sodium hydroxide, lithium hydroxide, and mixture solutions thereof.

In chemical etching, it is preferred to use an etchant that permits selective etching, exhibiting different etching rates between the metal element forming an alloy with lithium and a metal element not forming an alloy with lithium.

The electrochemical etching is a process for using an object to be etched as an electrode, applying an electric field between the opposite electrodes in an electrolyte solution, and thereby electrochemically eluting metal ions from the object. Electrolyte solutions suitably applicable for the metal alloy powder containing aluminum as a metal element forming an alloy with lithium are, for example, phosphoric acid, sulfuric acid, chromic acid, and mixture solutions thereof.

The plasma etching is a process for etching an object by making a plasma of an etching gas and letting reactive ions or radicals react with the etched object. The etching gas as a raw material suitably applicable is, for example, tetrachloromethane, tetrafluoromethane, chlorine, trichloromonofluoromethane, dichlorodifluoromethane, or chlorotrifluoromethane.

Surface Covering of the Negative Pole

The film for covering the surface of the negative pole in the present invention is an insulator film or a semiconductor film that permits lithium ions selectively to permeate but does not permit lithium metal separated out to permeate. This can enhance the suppressing effect against occurrence of dendrite upon charge.

Specifically, a material for covering the surface of negative pole in the present invention is one having pores or a molecular structure that permits lithium ions to permeate. Materials having the molecular structure that permit lithium ions to permeate are, for example, polymers having the structure of a macrocyclic ether or an ether linkage. A process for positively producing pores that lithium ions can permeate may be a method for mixing a material that can be eluted after formation of a coating, such as an electrolytic salt, in a coating solution of the film material, or a method for producing pores by mixing a foaming agent or a readily thermally decomposed material therein.

Positive Pole

The applicable positive pole 1003 to the present invention is one including the anode active material (the substance to which lithium can be inserted) 1002, for example, such as carbon, aluminum metal, a lithium alloy, or an aluminum alloy, in addition to the cathode active material 1001.

The carbon preferred is one that can insert as many lithium ions as possible upon excessive discharge of cell, preferably amorphous carbon or artificial graphite or natural graphite highly graphite-crystallized. Particularly preferred is one having a smaller potential change upon insertion of lithium ions, because the discharge depth of the positive pole thereof is not so deep upon excessive discharge Accordingly, the artificial graphite or natural graphite highly graphite-crystallized is suitably used.

Amorphous carbon is obtained by thermally treating coal pitch or petroleum pitch below 2000° C., preferably below 1000° C., and the resultant is thermally treated in a vacuum atmosphere or in an inert gas atmosphere such as nitrogen, helium, or argon. The highly graphite-crystallized carbon is obtained by thermally treating artificial graphite, obtained by thermally treating coal pitch or petroleum pitch above 2000° C. or natural graphite, in a vacuum atmosphere or in an inert gas such as nitrogen, helium, or argon. Graphite crystallinity of the artificial graphite or natural graphite is preferably as high as possible, and preferably below the average spacing (0.34 nm by the x-ray diffraction method) at which graphite crystallization starts progressing.

The aluminum metal or aluminum alloy preferred is subjected to the etching treatment or the like to increase the specific surface area in order to facilitate alloy formation with lithium upon excessive cell discharge.

The greater the amount of the anode active material added to the positive pole, the higher the capacity in the excessive discharge region shown in FIG. 1, which makes the cell more resistant to excessive discharge. Since the added anode active material also functions as a conductive material, it has an effect to reduce the impedance of the positive pole. However, an increase of the amount of the anode active material added to the positive pole will result in a reduction in the capacity of the positive pole and the potential of the positive pole also shifts to the potential of the added anode active material to lower the cell voltage, resulting in a reduction in the cell capacity.

Accordingly, using the added anode active material instead of the conductive aid, such as acetylene black, normally added into the positive pole, an actual amount is preferably determined by replacing a part or all of the volume of the conductive aid such as acetylene black with an amount of the anode active material. Namely, in most cases where aluminum or a lithium alloy is used as the anode active material, it can be added up to 4% by weight of the anode active material without reducing the cell capacity. In the aluminum alloy, the amount differs depending upon the type of the metal alloyed with aluminum or a composition ratio between them; for example, in a nickel-aluminum alloy (Ni:Al=50:50), an amount of up to 5% by weight is preferred in that the anode active material can be added without substantially lowering the positive pole capacity. Further, taking into consideration that variations in capacities of actual cells are about 10%, the addition is preferably determined so as to be 10 or more % of the positive pole capacity.

A method for adding the anode active material to the positive pole may be uniformly mixing it with the cathode active material in order to facilitate uniform reaction of the entire electrode upon excessive discharge, or a method for laying a coating on the surface of the positive pole making it easy to undergo the electrode reaction. For the coating of the anode active material being laid on the electrode surface, if a mixture of the cathode active material and the anode active material is used, the cathode active material can also be located on the electrode surface, which makes the electrode reaction take place more easily.

The following is an example of the process for producing the positive pole 1003.

(1) The anode active material, conductive aid, and binder are mixed as necessary in the cathode active material, and thereafter an organic solvent or the like is added thereto to prepare a paste with an adjusted viscosity.

(2) The paste obtained in the above step (1) is applied or packed onto the surface of a collector member such as a metal, and thereafter is dried or sintered to form the positive pole 1003.

As the conductive aid used for the positive pole, applicable materials are, for example, powder or fiber of aluminum, copper, nickel, or stainless steel, and carbon powder or carbon fiber of carbon black (for example, Ketjen black, acetylene black, etc.). A preferred material for the binder is one stable against the electrolyte solution, for example, one suitably selected from polytetrafluoroethylene, polyvinylidene fluoride, polyethylene, polypropylene, ethylene-propylene copolymer, and ethylene-propylene-diene terpolymer.

The positive pole can also be prepared in such a manner that the anode active material and the cathode active material are mixed at an adjusted formulation, the conductive aid, the binder, etc. are added as necessary, then an organic solvent is added to form a paste, and then a coat of the paste is laid on the surface of the positive pole. In this method, multiple coatings may be provided, or the above formulation may be changed coating from coating or as necessary to form coatings, thereby preparing the positive pole.

The collector member functions to supply currents efficiently consumed in the electrode reaction upon charge and discharge, or functions to collect currents generated. Thus, a desired material for the collector is one having a high conductivity and being inactive to the cell reaction. Preferred materials are, for example, nickel, titanium, copper, aluminum, stainless steel, platinum, palladium, gold, zinc, various alloys, and composite metals of two or more selected from the aforementioned materials, etc. The collector may take the configuration selected, for example, from the shapes of plate, foil, mesh, sponge, fiber, punching metal, expand metal, etc.

Materials generally used for the cathode active material are transition metal oxides and transition metal sulfides. A transition metal element in the transition metal oxides and transition metal sulfides may be selected from elements partially having the d-shell or the f-shell, specifically, Sc, Y, lanthanoids, actinoids, Ti, Zr, Hf, V, Nb, Ta, Cr, Mo, W, Mn, Tc, Re, Fe, Ru, Os, Co, Rh, Ir, Ni, Pd, Pt, Cu, Ag, and Au. Mainly, it is preferred to use the first transition series metals of Ti, V, Cr, Mn, Fe, Co, Ni, and Cu.

Separator

The separator in the present invention prevents short circuit between the negative pole and the positive pole. In some cases, it reserves the electrolyte solution. The separator needs to have pores through which lithium ions can move and be insoluble and stable to the electrolyte solution. Thus, a material for the separator is selected, for example, from nonwoven fabrics of glass, polypropylene, polyethylene, fluororesins, or polyamide, or materials having a micropore structure. Further, the material can also be selected from metal oxide films having micropores, or composite resin films including a metal oxide. Particularly, when a metal oxide film of a multi-layered structure is used, an effect to prevent a short circuit is outstanding because it is resistant to penetration of dendrite. Use of a fluororesin film, which is a flame-retardant material, or glass or a metal oxide film, which is a non-combustible material, is preferred because cell safety can be enhanced.

Electrolyte

Any of the following three methods may be employed as a method for using the electrolyte in the present invention.

(1) A method for using the electrolyte as it is.

(2) A method for using the electrolyte in the form of a solution in which the electrolyte is dissolved in a solvent.

(3) A method for using the electrolyte in a solid form obtained by adding a gelatinizer such as a polymer into a solution thereof.

Generally, an electrolyte solution in which the electrolyte is dissolved in a solvent is used as reserved in a porous separator.

It is to be desired that the conductivity of the electrolyte be determined as a value at 25° C., preferably not less than $1 \times 10^{-3}$ S/cm, and more preferably not less than $5 \times 10^{-3}$ S/cm.

The electrolyte may be selected, for example, from acids of $H_2SO_4$, HCl, $HNO_3$, etc., salts capable of supplying the lithium ion ($Li^+$) and a Lewis acid ion ($BF_4^-$, $PF_6^-$, $ClO_4^-$, $CF_3SO_3^-$, $BPh_4^-$ (Ph: phenyl group)), and mixture salts of these. Also applicable are salts capable of supplying a cation such as a sodium ion, a potassium ion, a tetraalkylammonium ion, etc., and a Lewis acid ion. The above salts are desired to be used after sufficient dehydration and elimination of oxygen as preliminarily conducted, for example, by heating under a reduced pressure.

The solvent applicable for the electrolyte may be either one selected, for example, from acetonitrile, benzonitrile, propylene carbonate, ethylene carbonate, dimethyl carbonate, diethyl carbonate, dimethylformamide, tetrahydrofuran, nitrobenzene, dichloroethane, diethoxyethane, 1,2-dimethoxyethane, chlorobenzene, γ-butyrolactone, dioxolan, sulfolane, nitromethane, dimethyl sulfide, dimethyl sulfoxide, dimethoxyethane, methyl formate, 3-methyl-2-oxydiazolydinone, 2-methyltetrahydrofuran, 3-propylsydnone, sulfur dioxide, phosphoryl chloride, thionyl chloride, sulfuryl chloride, and mixtures thereof.

The above solvent is preferably subjected to dehydration, for example, by activated alumina, molecular sieve, phosphorus pentoxide, or calcium chloride, or to impurity removal and dehydration by distilling it in the presence of an alkali metal in an inert gas, depending upon the type of the solvent.

It is preferable to gelatinize the solvent in order to prevent leakage of the electrolyte solution. It is desirable to use a polymer which swells as absorbing the solvent of the electrolyte solution. Polymers suitably applicable are, for example, polyethylene oxide, polyvinyl alcohol, and polyacrylamide.

Configuration and Structure of Cell

The configuration of the cell in the present invention may be, for example, a flat shape, a cylindrical shape, a rectangular parallelepiped shape, or a sheet shape. The structure of the cell may be, for example, of a single-layer type, of a multi-layer type, or of a spiral type. Among them, a spiral-type and cylindrical-shape cell may have a large electrode area per volume by rolling the separator between the negative pole and the positive pole all together, thus permitting a flow of a large current upon charge and discharge. The cell of the rectangular parallelepiped shape is effective to utilizing a housing space in a device which houses the secondary cell.

Figure 3:
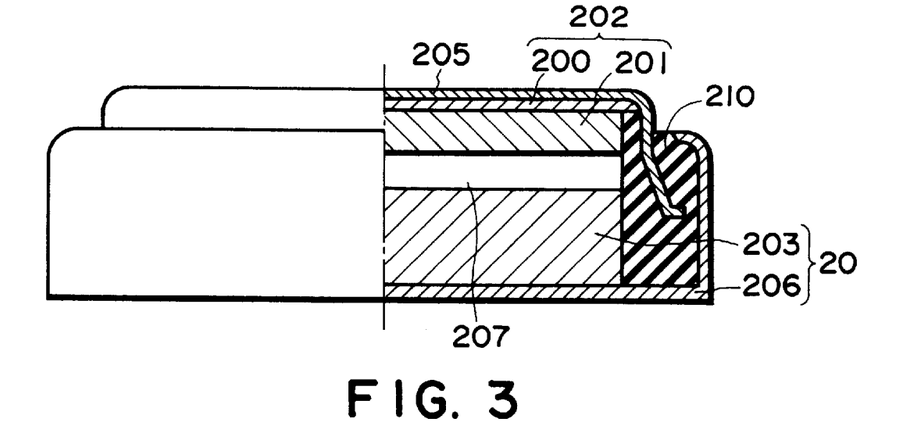
FIG. 3 is a diagrammatic, partial, sectional view of an example of a single-layer flat-type cell.

The configuration and structure of the cell will be explained below in more detail with reference to FIGS. 3 and 4. FIG. 3 is a diagrammatic, partial, sectional view of a single-layer-type flat-shape cell, and FIG. 4 is a diagrammatic, partial, sectional view of a spiral-type cylindrical-shape cell.

Figure 4:
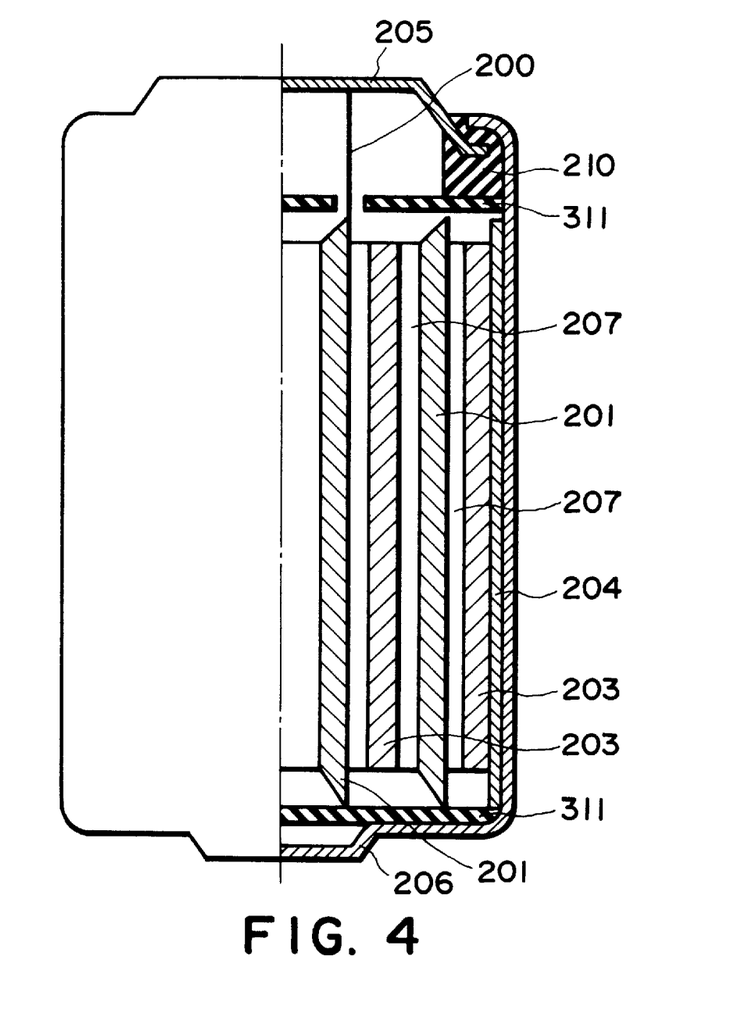
FIG. 4 is a diagrammatic, partial, sectional view of an example of a spiral cylinder-type cell.

In FIG. 3 and FIG. 4, reference numeral 200 designates the cathode collector, 201 the anode active material, 202 the negative pole, 203 the cathode active material, 204 the anode collector, 205 a negative-pole terminal (negative-pole cap), 206 a positive-pole can, 207 the separator reserving the electrolyte solution, 208 the positive pole, 210 an insulator packing, and 311 an insulator plate.

A suitable example of a method for assembling the cells shown in FIG. 3 and FIG. 4 is the following:

(1) The separator is sandwiched between the anode active material and the cathode active material formed, and the combination is incorporated into the positive-pole can.

(2) The electrolyte is poured into the can, and thereafter the negative-pole cap and insulator packing are placed to effect provisional assembling.

(3) Then the positive-pole can and negative-pole cap are caulked to complete a cell.

It is desired to perform preparation of materials for the lithium cell and assembly of the cell as described above in a dry air or in a dry inactive gas from which water is thoroughly removed in order to avoid reaction between lithium and water.

Insulator Packing

Materials for the insulator packing in the present invention may be selected, for example, from fluororesins, polyamide resins, polysulfone resins, and various rubbers.

The sealing method of the insulator packing may be not only the "caulking" using a gasket comprised of the insulator packing as shown in FIG. 3 and FIG. 4, but also any method out of glass tube sealing, a method using an adhesive, welding, soldering, etc.

A material applicable for the insulator plate shown in FIG. 4 may be selected, for example, from various organic resin materials and ceramics.

Outer Can

The outer can in the present invention is comprised of the positive-pole can of the cell and the negative-pole cap. A material for the outer can may be selected from various materials, among which stainless steel is suitably used. Specifically, titanium clad stainless steel plate, copper clad stainless steel plate, and nickel plated steel plate are suitably used, for example.

Since in FIG. 3 and FIG. 4 the positive-pole can also serve as a cell case, the above stainless steel is preferred. However, when the positive-pole is not serving as a cell case, materials suitable for the cell case may include metals, for example, such as zinc as well as stainless steel, plastics such as polypropylene, and composite materials between metal or glass fiber and plastic.

Safety Valve

Although not shown in FIG. 3 or FIG. 4, the cell is normally provided with a safety valve or a substitute mechanism or structure as a safety measure against increases of the inner pressure of the cell. The applicable safety valve may be, for example, a rubber, a spring, a metal ball, or an explosion foil.

The present invention will be explained in further detail, based on specific examples. It should, however, be noted herein that the present invention is not intended to be limited to these examples.

EXAMPLE 1

In this example, a lithium secondary cell having the sectional structure shown in FIG. 3 was produced. Next explained referring to FIG. 3 are production procedures of the respective constituent elements of the cell, and assembling of the cell.

(1) Production procedures of the negative pole
  (i) Aluminum powder (300 mesh under) was immersed in a 2% sodium hydroxide solution in which 0.05 mole of tungsten trioxide was dissolved, to effect etching of aluminum, thereby preparing porous aluminum powder (anode active material).
  (ii) Mixed into 82 wt % of the anode active material obtained in the above step (i) were 10 wt % of lithium-molybdenum disulfide ($LiMoS_2$), 3 wt % of acetylene black as a conductive aid, and 5 wt % of polyvinylidene fluoride as a binder, and thereafter the mixture was kneaded together with N-methylpyrrolidone to prepare a paste.
  (iii) The paste obtained in the above step (ii) was applied onto a nickel foil, using a coater, and then the resultant was dried and then pressed to obtain the negative pole.
(2) Production procedures of the positive pole
  (i) Electrolytic manganese dioxide and lithium carbonate were mixed at a ratio of 1:0.4, and thereafter the mixture was heated at 800° C. to prepare a lithium-manganese oxide (cathode active material).
  (ii) Mixed into 82 wt % of the cathode active material prepared in the above step (i) were 10 wt % of titanium-aluminum alloy powder, 3 wt % of acetylene black, and 5 wt % of polyvinylidene fluoride, and thereafter N-methylpyrrolidone was further added thereto, thus preparing a paste.
  (iii) The paste thus obtained in the above step (ii) was applied onto an aluminum foil, using the coater, and then the resultant was dried, thereby forming the positive pole.
(3) Production procedures of the electrolyte solution
  (i) The electrolyte solution was obtained by dissolving 1 M (mol/l) of lithium tetrafluoroborate in a mixture solvent of equal amounts of propylene carbonate (PC) and dimethoxyethane (DME) from which water was fully removed.
(4) Production procedures of the separator
  (i) The separator employed was one obtained by sandwiching nonwoven fabric of polypropylene between micropore separators of polypropylene.
(5) Assembling of cell The following assembling was carried out in a dry argon gas atmosphere.

First, the separator was placed between the negative pole and the positive pole, they were inserted into the positive-pole can of titanium clad stainless steel, and then the electrolyte solution was poured into the positive-pole can. After that, the positive-pole can was hermetically sealed using the negative-pole cap of titanium clad stainless steel and an insulator packing of a fluororubber, thus forming a lithium secondary cell.

Next is an evaluation of the performance of the cell thus produced. The performance evaluation was conducted as to the energy density per unit weight of cell and the cycle life, obtained in charge and discharge cycle tests.

Conditions of cycle tests were determined to perform charge and discharge of 0.1 C (10-hours rate, the current of 0.1 times capacity/hour) with respect to the reference of the electric capacity calculated from an amount of the cathode active material. Each of first three cycles was a cycle including charge up to the cut-off voltage 4.5 V, standing for 30 minutes, and discharge up to 2.0 V. Then a discharge capacity of the third cycle was taken as a cell capacity. Further, each cycle of the fourth cycle and succeeding cycles included a charge for 10 hours or charge up to the cut-off voltage 4.5 V, standing for 30 minutes after the charge, discharge for 11 hours (discharge of 110% of the reference capacity), and standing for 30 minutes after the discharge, thus effecting discharge under excessive discharge conditions. Then a cycle life of the cell was taken as a number of cycles when the discharge capacity reaches 60% of the discharge capacity of the third cycle. A charge and discharge apparatus of the cell employed was HJ-106M manufactured by Hokuto Denko. Results are shown in Table 1.

EXAMPLE 2

This example is different from Example 1 in the solutions applied by the coater in the production processes of the negative pole and the positive pole.

(1) Production procedures of the negative pole
  (i) Natural graphite thermally treated at 1000° C. in vacuum was used as the anode active material.
  (ii) Mixed into 85 wt % of the anode active material obtained in the above step (i) were 10 wt % of lithium-titanium disulfide ($LiTiS_2$) and 5 wt % of ethylene-propylene-diene terpolymer, and thereafter the mixture was kneaded together with xylene to prepare a paste.
  (iii) The paste thus obtained in the above step (ii) was applied onto a copper foil, using the coater, and then the resultant was dried and pressed, thus forming the negative pole.
(2) Production procedures of the positive pole
  (i) Mixed into 92 wt % of lithium-manganese oxide as described in Example 1 were 3 wt % of acetylene black and 5 wt % of ethylene-propylene-diene terpolymer, and thereafter the mixture was kneaded together with xylene to prepare a paste.
  (ii) The paste thus obtained in the above step (i) was applied onto an aluminum foil, using the coater, and then the resultant was dried and pressed, thus forming the positive pole.

The other procedures were the same as in Example 1. Evaluation results are shown in Table 1.

EXAMPLE 3

This example is different from Example 1 in the solutions applied by the coater in the production procedures of the negative pole and the positive pole.

(1) Production procedures of the negative pole
  (i) Aluminum powder (300 mesh under) was immersed in a 0.2% sodium hydroxide solution in which 0.05 mole of tungsten trioxide was dissolved, to effect etching of aluminum, thereby preparing porous aluminum powder (anode active material).
  (ii) Mixed into 92 wt % of the anode active material thus obtained in the above step (i) were 3 wt % of acetylene black as a conductive aid and 5 wt % of polyvinylidene fluoride of a binder, and thereafter the mixture was further kneaded together with N-methylpyrrolidone to prepare a paste.

(iii) The paste thus obtained in the above step (ii) was applied onto a copper foil using the coater, and the resultant was dried and then pressed to obtain the negative pole.

(2) Production procedures of the positive pole (i) Mixed into 85 wt % of the lithium-manganese oxide as described in Example 1 were 10 wt % of natural graphite thermally treated at 1000° C. in an argon gas, and 5 wt % of polyvinylidene fluoride, and thereafter the mixture was kneaded together with N-methylpyrrolidone to prepare a paste.

(ii) The paste thus obtained in the above step (i) was applied onto an aluminum foil, using the coater, and then the resultant was dried and pressed to form the positive pole.

The other procedures are the same as in Example 1. Evaluation results are shown in Table 1.

EXAMPLE 4

This example is different from the above-described examples in that, in the production procedures of the negative pole and the positive pole, two coatings are provided using two types of different solutions as solutions applied by the coater.

(1) Production procedures of the negative pole.

(i) Mixed into 92 wt % of the aluminum powder prepared by the etching treatment in Example 1 were 3 wt % of acetylene black and 5 wt % of polyvinylidene fluoride, and thereafter the mixture was further kneaded together with N-methylpyrrolidone to prepare a paste.

(ii) The paste thus obtained in the above step (i) was applied onto a copper foil, using the coater, and then the resultant was dried and pressed to obtain an electrode A.

(iii) Mixed into 46 wt % of the aluminum powder used in the above step (i) were 46 wt % of lithium-molybdenum disulfide ($LiMoS_2$), 3 wt % of acetylene black, and 5 wt % of polyvinylidene fluoride, and thereafter the mixture was kneaded together with N-methylpyrrolidone to prepare a paste.

(iv) The paste thus obtained in the above step (iii) was applied onto the electrode A obtained in the above step (ii), using the coater, and then the resultant was dried and pressed to obtain the negative pole. On this occasion, a ratio of lithium-molybdenum disulfide and aluminum in the negative pole was adjusted to be 1:9 by weight.

(2) Production procedures of the positive pole (i) Mixed into 92 wt % of the lithium-manganese oxide in Example 1 were 3 wt % of acetylene black and 5 wt % of polyvinylidene fluoride, and thereafter the mixture was further kneaded together with N-methylpyrrolidone to prepare a paste.

(ii) The paste thus obtained in the above step (i) was applied onto an aluminum foil, using the coater, and then the resultant was dried and pressed to obtain an electrode B.

(iii) Mixed into 46 wt % of the lithium-manganese oxide in Example 1 were 46 wt % of natural graphite thermally treated at 1000° C. in vacuum, 3 wt % of acetylene black, and 5 wt % of polyvinylidene fluoride, and thereafter the mixture was kneaded together with N-methylpyrrolidone to prepare a paste.

(iv) The paste thus obtained in the above step (iii) was applied onto the electrode B obtained in the above step (ii), and then the resultant was dried and thereafter pressed to obtain the positive pole. On this occasion, a ratio of the natural graphite and the lithium-manganese oxide in the positive pole wag adjusted to be 1:9 by weight.

The other procedures are the same as in Example 1. Evaluation results are shown in Table 1.

Comparative Example 1

A cell of the schematic, sectional structure shown in FIG. 2 was produced by the same procedures as in Example 1, using a negative pole prepared in the same manner as that in Example 2 except that lithium-titanium disulfide ($LiTiS_2$) in the negative pole in Example 2 was removed.

This example is different from Example 2 in that lithium-titanium disulfate ($LiTiS_2$) in the negative pole was removed.

The other procedures are the same as in Example 2.

Table 1 shows the results of performance evaluation of the lithium secondary cells produced in Examples 1 to 4 and 7 and Comparative Example 1 all together. Here, the evaluation results of Examples 1 to 4 and 7 concerning the cycle life and the energy density per unit weight of cell are described as normalized as setting the values of Comparative Example 1 to 1.

TABLE 1

|  | Energy density | Cycle life |
| --- | --- | --- |
| Example 1 | 1.3 | 3.0 |
| Example 2 | 1.0 | 2.2 |
| Example 3 | 1.4 | 2.0 |
| Example 4 | 1.3 | 2.9 |
| Example 7 | 1.0 | 2.3 |

As shown in Table 1, it was confirmed that the lithium secondary cells of Examples 1 to 4 and Example 7 as described below were greatly improved in the cycle life as compared with the cell of the comparative example. Particularly, it was confirmed that the lithium secondary cells of Example 1, Example 3, and Example 4 were also improved in the energy density in addition to the improvement in the cycle life.

Further, the cycle lives obtained here were of the same level or more than those of the conventional lithium secondary cells having the carbon negative pole (commercially available). As for the energy density, even the lithium secondary cell of Comparative Example 1 showed an improvement of 50% or more over the conventional lithium secondary cells having the carbon negative pole (commercially available).

It was thus found that the lithium secondary cells of Examples 1 to 4 had significantly improved cell characteristics over the conventional lithium secondary cells having the carbon negative pole, commercially available.

Only one type of oxide, i.e. lithium-manganese oxide, was used as the cathode active material in Examples 1 to 4 in order to evaluate the performance of the negative pole, but it is a matter of course that the cathode active material is not limited to this material and other various cathode active materials such as lithium-nickel-oxide, lithium-cobalt oxide, etc. can also be employed.

Further, aluminum metal or natural graphite was used as the anode active material in Examples 1 to 4, but it is needless to mention that the anode active material is not limited to these materials, and other anode active materials such as lithium metal, lithium alloys, aluminum alloys, etc. may also be employed.

EXAMPLE 5

In this example, two cells were produced in the structure of the cell of Example 1, one cell (cell α) having the cell capacity equal to 100% of the reference capacity and the other cell (cell β) having the cell capacity equal to 90% of the reference capacity. The two cells, cell α and cell β, were connected in series to produce a combinational cell A.

This combinational cell A was evaluated as to the cycle life in the same manner as in Example 1.

Comparative Example 2

In this example, two cells were produced in the structure of the cell of Comparative Example 1, one cell (cell γ) having the cell capacity equal to 100% of the reference capacity and the other cell (cell δ) having the cell capacity equal to 90% of the reference capacity. The two cells, cell γ and cell δ, were connected in series to produce a combinational cell B.

This combinational cell B was evaluated as to the cycle life in the same manner as in Example 5.

As a result, checking the cycle lives of the lithium secondary cells produced in Example 5 and in Comparative Example 2, the cycle life of Example 5 was 2.5 times longer than that of Comparative Example 2. Accordingly, it was confirmed that, by employing the secondary cells of the present invention, the combinational cell A in which a plurality of cells different in the cell capacity were connected in series had the extended cell life even if the tests were conducted under excessively discharged conditions.

EXAMPLE 6

In this example, the cycle life was evaluated in the same manner as in Example 5 except that the two cells, cell α and cell β, used in Example 5 were connected in parallel to produce a combinational cell C.

Comparative Example 3

In this example, the cycle life was evaluated in the same manner as in Comparative Example 2 except that the two cells used in Comparative Example 2, cell γ and cell δ, were connected in parallel to produce a combinational cell D.

Checking the cycle lives of the lithium secondary cells produced in Example 6 and Comparative Example 3, the cycle life of Example 6 was 2.3 times longer than that of Comparative Example 3. Accordingly, it was confirmed that, by employing the secondary cells of the present invention, the combinational cell C in which a plurality of cells different in the cell capacity were connected in parallel had the extended cell life even if it was tested under excessively discharged conditions.

EXAMPLE 7

(1) Production procedures of the negative pole
(i) Mixed into 75 wt % of the natural graphite as described in Example 2 were 20 wt % of lithium-titanium oxide ($Li_{4/3}Ti_{5/3}O_4$) and 5 wt % of polyvinylidene fluoride, and thereafter the mixture was kneaded together with N-methylpyrrolidone to prepare a paste.
(ii) The paste thus obtained in the above step (i) was applied onto a copper foil, using the coater, and then the resultant was dried and thereafter pressed to form the negative pole.

(2) Production procedures of the positive pole.
(i) Mixed into 80 wt % of the lithium-manganese oxide as described in Example 1 were 15 wt % of natural graphite thermally treated at 1000° C. and 5 wt % of polyvinylidene fluoride, and thereafter the mixture was kneaded together with N-methylpyrrolidone to prepare a paste.
(ii) The paste thus obtained in the above step (i) was applied onto an aluminum foil, using the coater, and then the resultant was dried and thereafter pressed to form the positive pole.

The other procedures were the same as in Example 1. Evaluation results are shown in Table 1.

EXAMPLE 8

In order to check influence of the addition amount of lithium-titanium oxide added to the negative pole in Example 7, cells with addition amounts changing from 0 to 80 wt % were produced and evaluated. Here, the addition amount of polyvinylidene fluoride in the negative pole was fixed (at 5 wt %).

The cells were produced in the same manner as in Example 7 except for the use of the above negative poles.

The results of performance evaluation of the lithium secondary cells produced in Example 8 are shown in Table 2. Here, the cycle lives were normalized as setting the cycle life of the cell using the negative pole of the addition amount 0 wt % (no additive) of lithium-titanium oxide to 1.

As shown in Table 2, it was found that the effect of the present invention appeared and the cycle life could be improved as long as the addition amount of lithium-titanium oxide was within the range of 3 to 60 wt %.

TABLE 2

| Addition amount of lithium-titanium oxide | Cycle life |
| --- | --- |
| 0 wt% | 1.0 |
| 3 | 1.3 |
| 5 | 1.5 |
| 10 | 2.3 |
| 20 | 2.3 |
| 30 | 2.0 |
| 40 | 1.7 |
| 60 | 1.2 |
| 80 | 0.7 |

EXAMPLE 9

(1) Production procedures of the negative pole
(i) An aluminum foil was immersed in a solution of potassium hydroxide to be etched, and thereafter was washed with water and dried.
(ii) Applied onto the surface of the aluminum foil thus processed in the above step (i) was a paste obtained by kneading 90 wt % of lithium-titanium,oxide, 5 wt % of acetylene black, and 5 wt % of polyvinylidene fluoride together with N-methylpyrrolidone, using spin coat.

The other procedures were the same as in Example 1. Evaluation results are shown in Table 3.

Comparative Example 4

This example is different from Example 9 in that the layer of lithium-titanium oxide (including acetylene black and polyvinylidene fluoride) on the surface of the negative pole in Example 9 was removed.

Namely, the present comparative example used the aluminum foil obtained by the processing of the step (i) in Example 9 for the negative pole.

The other procedures were the same as in Example 9.

TABLE 3

| | Cycle life |
|---|---|
| Example 9 | 2.1 |

Table 3 shows the result of performance evaluation of the lithium secondary cell produced in Example 9. Here, the result of cycle life is described as normalized by setting the value of Comparative Example 4 to 1.

EXAMPLE 10

(1) Production procedures of the positive pole
  (i) Vanadium pentaoxide $V_2O_5$ and lithium carbonate were mixed at a molar ratio of V:Li equal to 2:1, and thereafter the mixture was calcined at 700° C. to prepare lithium-vanadium oxide ($LiV_2O_4$).
  (ii) Mixed into 85 wt % of lithium-vanadium oxide thus prepared in the above step (i) were 10 wt % of natural graphite thermally treated at 1000° C. and 5 wt % of polyvinylidene fluoride, and thereafter N-methylpyrrolidone was further added thereto to prepares a paste.
  (iii) The paste thus obtained in the above step (ii) was applied onto an aluminum foil, using the coater, and then the resultant was dried to form the positive pole.
(2) Production procedures of the negative pole
  (i) Mixed into 85 wt % of natural graphite thermally treated at 1000° C. were 10 wt % of lithium-vanadium oxide prepared in the above step (i) and 5 wt % of polyvinylidene fluoride, and thereafter N-methylpyrrolidone was further added thereto to prepare a paste.
  (ii) The paste thus obtained in the above step (i) was applied onto a copper foil, using the coater, and then the resultant was dried to form the negative pole.

The other procedures were the same as in Example 1. The evaluation result is shown in Table 4.

Comparative Example 5

This example is different from Example 10 in that the natural graphite was removed from the positive pole of Example 10 and in that the lithium-vanadium oxide was removed from the negative pole.

The other procedures were the same as in Example 10.

TABLE 4

| | Cycle life |
|---|---|
| Example 10 | 2.1 |

Table 4 shows the result of performance evaluation of the lithium secondary cell produced in Example 10. Here, the result of cycle life is described as normalized by setting the result of Comparative Example 5 to 1.

As explained above, the present invention can prevent the negative pole and/or the positive pole from being excessively discharged; and thus, even in the case of a plurality of cells being connected in series or in parallel, deterioration of cells can be decreased, thus achieving the lithium secondary cells with extended cycle lives.

Further, the present invention can provide lithium secondary cells exhibiting excellent excessive discharge characteristics and excellence in usage as a combinational cell.

What is claimed is:

1. A lithium secondary cell having a positive pole comprising cathode active material, a negative pole comprising anode active material, a separator and an electrolyte in a cell case, wherein said negative pole also contains cathode active material and said positive pole also contains anode active material; and
   wherein at least said cathode active material constituting said positive pole contains lithium during discharge of said lithium secondary cell.

2. The lithium secondary cell according to claim 1, wherein said negative pole contains lithium, a lithium alloy, aluminum, an aluminum alloy excluding lithium, or carbon.

3. The lithium secondary cell according to claim 1, wherein said negative pole contains, as said cathode active material, at least one compound selected from the group consisting of a metal oxide, a metal sulfide, a metal hydroxide, and a metal selenide.

4. The lithium secondary cell according to claim 3, wherein said at least one compound contains at least one element selected from the group consisting of Cu, Fe, Mo, Ti, V, Nb, Mn, Co and Ni.

5. The lithium secondary cell according to claim 1, wherein said positive pole contains, as said anode active material, at least one selected from the group consisting of carbon, aluminum metal, a lithium alloy, and an aluminum alloy excluding lithium.

6. The lithium secondary cell according to claim 5, wherein said aluminum alloy contains at least one element selected from Ni, Co, Cu, and Ti.

7. The lithium secondary cell according to claim 1, wherein said cathode active material is a substance that binds and releases lithium ions.

8. The lithium secondary cell according to claim 1, wherein said cathode active material contained in the positive pole is a substance that releases lithium ions during charging of the cell.

9. A lithium secondary cell according to claim 1, wherein said anode active material is a substance that binds and releases lithium ions.

10. A lithium secondary cell according to claim 1, wherein said cathode active material contained in the negative pole is a substance that releases lithium ions during excessive discharging of the cell.

11. A lithium secondary cell according to claim 1, wherein said anode active material contained in the negative pole is a substance that binds lithium ions during charging of the cell.

12. A lithium secondary cell according to claim 1, wherein said anode active material contained in the positive pole is a substance that releases lithium ions during charging of the cell following a state of excessive discharging.

13. A lithium secondary cell according to claim 1, wherein said anode active material contained in the positive pole binds lithium ions generated during excessive discharging of the cell.

14. A lithium secondary cell according to claim 9, wherein said anode active material is added in an amount from 3% to 60% by weight.

15. A lithium secondary cell according to claim 1, wherein said cathode active material contained in the negative pole is a substance that binds lithium ions during charging of the cell following a state of excessive discharging.

* * * * *

UNITED STATES PATENT AND TRADEMARK OFFICE
CERTIFICATE OF CORRECTION

PATENT NO. : 5,998,063
DATED : December 7, 1999
INVENTOR(S) : NAOYA KOBAYASHI ET AL.

Page 1 of 3

It is certified that error appears in the above-identified patent and that said Letters Patent is hereby corrected as shown below:

ON THE TITLE PAGE [56] References Cite:

FOREIGN PATENT DOCUMENTS,
"05047381" should read --5-047381--.
05190171          5-190171
05234585          5-234585
06283157          6-283157

SHEET 1:

FIG. 1, "DISCHAGE PERIOD" should read --DISCHARGE PERIOD--.

SHEET 2:

FIG. 2, "DISCHAGE PERIOD" should read --DISCHARGE PERIOD--.

COLUMN 3:

Line 51, "material activator," should read --material--.

UNITED STATES PATENT AND TRADEMARK OFFICE
CERTIFICATE OF CORRECTION

PATENT NO. : 5,998,063
DATED : December 7, 1999
INVENTOR(S) : NAOYA KOBAYASHI ET AL.

It is certified that error appears in the above-identified patent and that said Letters Patent is hereby corrected as shown below:

COLUMN 9:

Line 15, "discharge" should read --discharge.--; and
    Line 55, "anode" should read --cathode--.

COLUMN 11:

Line 34, "as" should read --are--.

COLUMN 12:

Line 3, "to" should read --for--.

COLUMN 16:

Line 6, "wag" should read --was--;
    Line 18, "disulfate" should read --disulfide--; and
    Line 63, "lithium-nickel-oxide" should read --lithium-nickel oxide--.

COLUMN 18:

Line 54, "lithium-titanium,oxide," should read --lithium-titanium oxide,--.

UNITED STATES PATENT AND TRADEMARK OFFICE
CERTIFICATE OF CORRECTION

PATENT NO.   : 5,998,063
DATED        : December 7, 1999
INVENTOR(S)  : NAOYA KOBAYASHI ET AL.

It is certified that error appears in the above-identified patent and that said Letters Patent is hereby corrected as shown below:

COLUMN 19:

Line 24, "pares" should read --pare--.

Signed and Sealed this

Eighth Day of May, 2001

Attest:

NICHOLAS P. GODICI

Attesting Officer

Acting Director of the United States Patent and Trademark Office